(12) United States Patent
Mainous et al.

(10) Patent No.: US 7,441,578 B2
(45) Date of Patent: Oct. 28, 2008

(54) RELEASE LINER STAGING UNIT AND SYSTEM INCORPORATING SAME

(75) Inventors: David Lee Mainous, Hamilton, OH (US); David Allen Popham, Hesperia, CA (US); John Paul G. Chambers, Hamilton, OH (US); Chris Mark Jamison, West Chester, OH (US)

(73) Assignee: Valco Cincinnati, Inc., Cincinnati, OH (US)

( * ) Notice: Subject to any disclaimer, the term of this patent is extended or adjusted under 35 U.S.C. 154(b) by 473 days.

(21) Appl. No.: 11/116,122

(22) Filed: Apr. 27, 2005

(65) Prior Publication Data

US 2005/0252597 A1    Nov. 17, 2005

Related U.S. Application Data

(60) Provisional application No. 60/565,646, filed on Apr. 27, 2004.

(51) Int. Cl.
*B32B 41/00* (2006.01)

(52) U.S. Cl. .................... 156/360; 156/361; 156/367; 156/368; 226/118.1; 226/118.4; 226/118.5

(58) Field of Classification Search ............. 226/118.1, 226/118.4, 118.5; 156/360, 361, 367, 368
See application file for complete search history.

(56) References Cited

U.S. PATENT DOCUMENTS

| 5,241,432 A * | 8/1993 | Sota et al. ............. 360/71 |
| 5,350,477 A | 9/1994 | Chevalier et al. |
| 5,443,678 A | 8/1995 | Chevalier et al. |

FOREIGN PATENT DOCUMENTS

WO    WO 03/078078 A2    9/2003

\* cited by examiner

*Primary Examiner*—George R Koch, III
(74) *Attorney, Agent, or Firm*—Dinsmore & Shohl LLP

(57) ABSTRACT

A release liner staging unit for depositing a release liner onto an adhesive layer. The unit includes an accumulator that creates a buffer between an amount of release liner supplied and an amount needed for covering a layer of adhesive. The tendency of release liner placed within the accumulator to settle allows additional release liner to be introduced, thereby producing a slightly saturated level of release liner in the accumulator. Time delays can be accounted for to reduce the number of times a drive mechanism needs to operate, thereby reducing wear on such componentry. The unit may also form part of a larger release liner application device and adhesive application system.

15 Claims, 5 Drawing Sheets

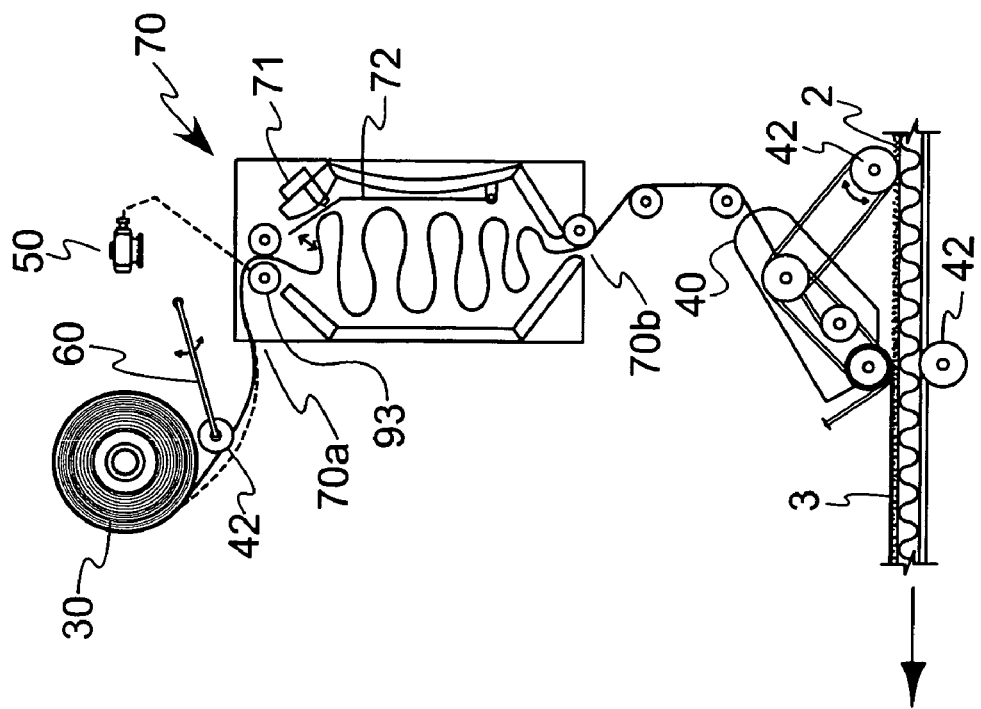
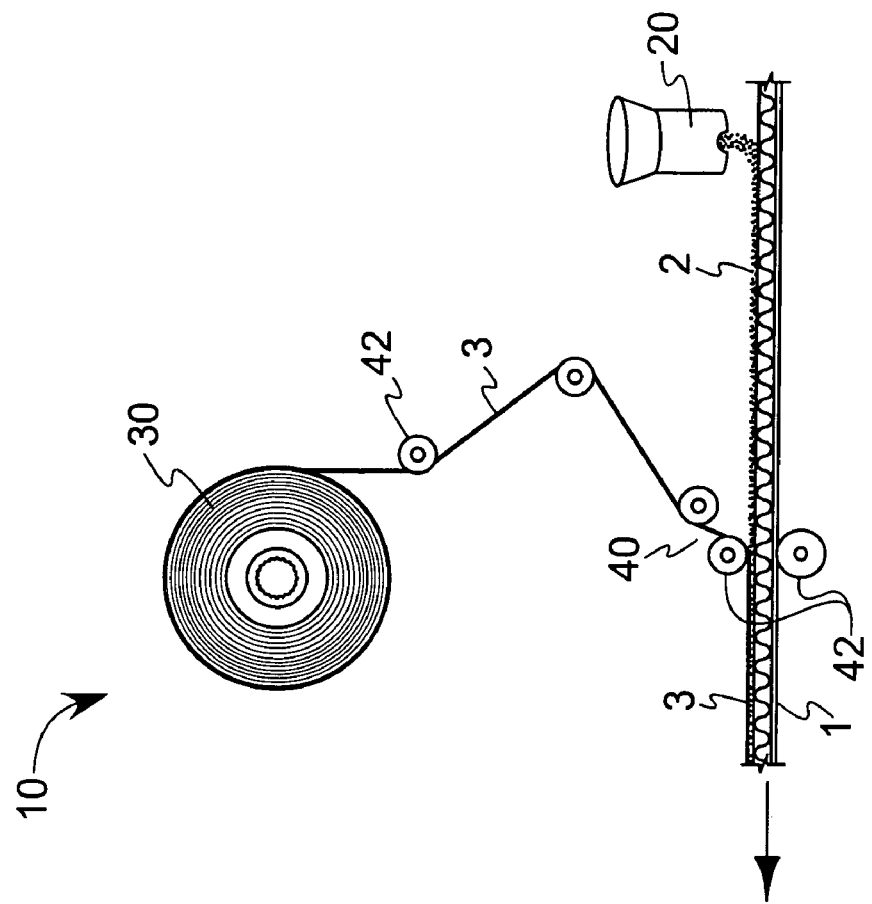
FIG. 1 (Prior Art)
FIG. 2 (Prior Art)

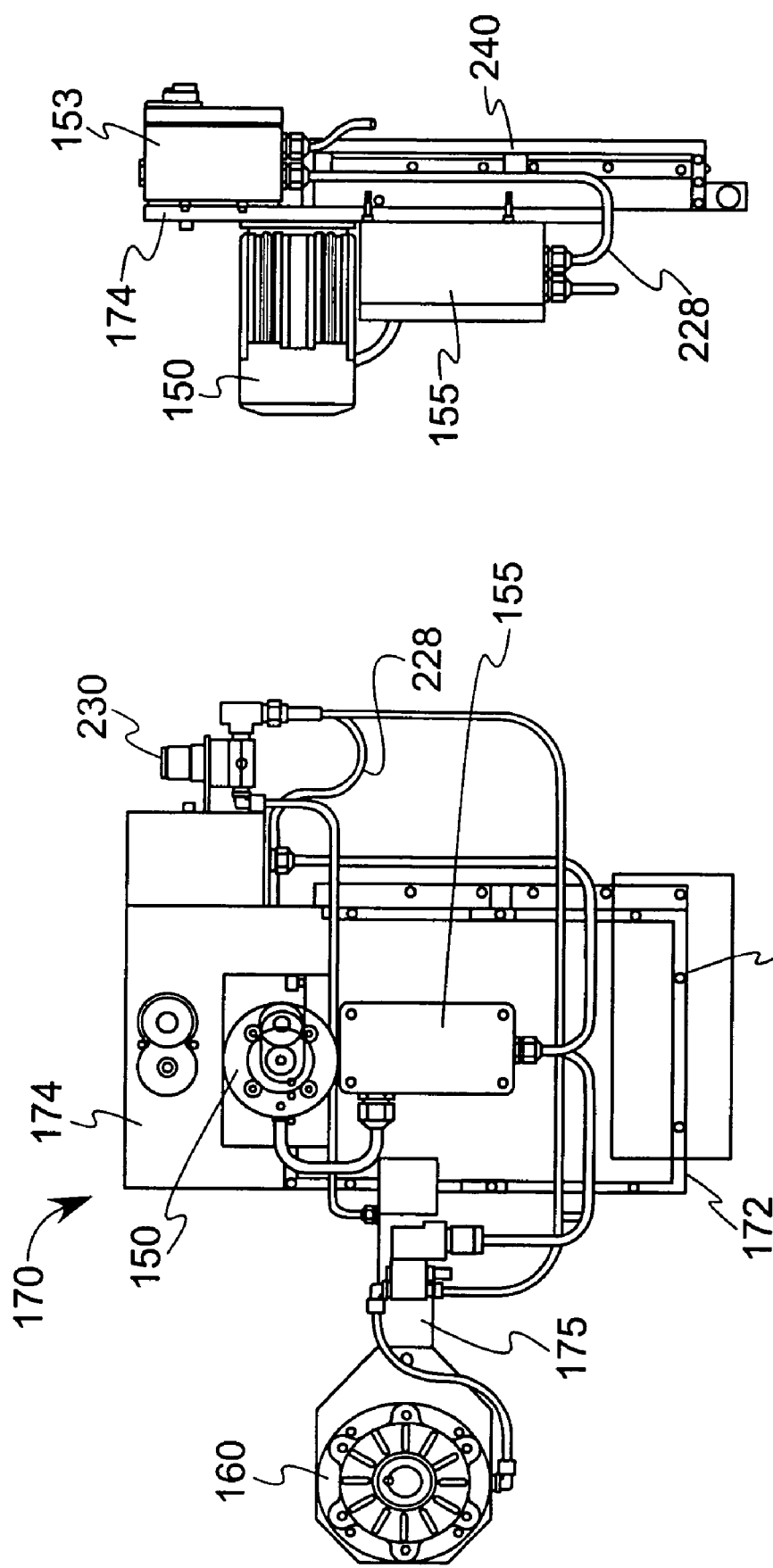

RELEASE LINER STAGING UNIT AND SYSTEM INCORPORATING SAME

CROSS-REFERENCE TO RELATED APPLICATIONS

This application is based on U.S. provisional application Ser. No. 60/565,646, filed Apr. 27, 2004.

BACKGROUND OF THE INVENTION

This invention relates generally to a device for applying a release liner to an adhesive that is disposed on a substrate, and more particularly to an improved accumulator that regulates the tension in the release liner as the liner is being applied.

Automated gluing systems are routinely used to affect high-speed, repeatable application of adhesives to various substrates such that upon contact between the adhesive-containing substrate and another surface, a bond or seal is formed. Such systems are employed in deferred-use packaging, where a pressure-sensitive adhesive is covered with a release liner such that upon subsequent removal of the release liner and placement of the exposed adhesive in contact with a desired surface, the surface on which the adhesive is placed and the desired surface can be joined. In one form, the adhesive is integrated into a double-sided transfer tape that can be placed onto a substrate, where the side of the tape facing away from the substrate retains its layer of release liner to prevent the adhesive from being exposed until needed. While the transfer tape generally performs well, it is expensive and, due in part to its multiplicity of layers, very bulky. In another popular form, the adhesive is placed in a hot-melt liquid form onto a substrate, then covered with a layer of release liner. The hot melt approach is advantageous over the transfer tape approach because the lower bulk permits longer run-times between replenishment of the adhesive and release liner. In addition, the material costs are considerably lower than for transfer tape-based systems. Both the hot-melt approach and the transfer tape approach have been used extensively in the manufacture of paper and related products, such as corrugated cardboard sheet.

In a conventional gluing station utilizing the hot-melt approach, the sheet is fed adjacent an aligned valve and nozzle such that upon actuation of the valve, a stream of the adhesive is deposited onto the desired location on the sheet through the nozzle. Downstream of that, a release liner application station places a layer of release liner (such as a silicone-coated film or tape) on top of the adhesive to protect it. One shortcoming of existing release liner application stations is that the liner tape or film is pulled from a roll that exhibits inertial effects that can alternately place too much or too little tension on the release liner. In situations involving too much tension on the liner, the concomitant pulling produces a tendency in the liner to slide out of the desired position on the underlying adhesive. Similarly, in situations involving too little tension, the liner can become slack, such that when tension is restored, a snapping motion can ensue, enhancing the possibility of liner breakage, especially in situations where the liner is very thin in order to keep cost and bulk down. Accordingly, what is needed is a way to buffer the supply of release liner so that it can be applied intermittently and at low tension to a layer of adhesive disposed on a substrate.

SUMMARY OF THE INVENTION

This need is met by the present invention, wherein a release liner not subject to the inertial effect inherent in a conventional supply roll can be placed over adhesive for deferred use applications. According to an aspect of the invention, a release liner staging unit that can be filled with release liner is disclosed. The unit includes an accumulator with an inlet, a release liner storage compartment and an outlet to allow release liner to be at least temporarily stored in the accumulator. In the present context, an accumulator functions as a temporary storage or collection site for release liner. In this way, tension-producing inertial effects associated with a constantly-moving supply of release liner are reduced, as the release liner can (even if for only a brief moment) be stored in the accumulator without being pulled by a workpiece or a downstream component. This allows for rapid acceleration and deceleration of the release liner without a high level of tension in the liner. The unit also includes a drive mechanism to selectively advance release liner into the accumulator. One feature of the drive mechanism is that its operation involves a measure of hysteresis such that it continues to introduce release liner into the storage compartment even after attainment of a predetermined level of release liner therein. This produces a saturated level of release liner that results in lower amounts of drive mechanism cycling. The design of the release liner staging unit ensures that inertial effects are low, allowing liner to be intermittently pulled from the unit under rapid acceleration and deceleration, yet under low tension.

Optionally, the thickness of the release liner staging unit is only slightly greater than the width of the release liner, thereby inhibiting twisting of the liner when situated in the liner storage compartment. Thus, by limiting the paths for air resident in the accumulator to circulate, this has the additional benefit of forming an air cushion to inhibit the formation of an overly dense stacking of release liner in the accumulator. Furthermore, the width of the unit can be made variable to accommodate release liner of differing widths, where a combination of spacers and panels that mount in the box take up the excess space that would cause the liner disposed in the unit to fall to the side. In addition, the unit may include access regions to facilitate cleaning, threading of the liner or the like. Moreover, anti-static devices (such as tinsel) can be placed at the inlet to prevent static from building up on the roll of web, where static can cause the loops of release liner to not fall into a correct serpentine pattern in the unit due to an adhesion of the release liner to electrically-chargeable plastic components (such as a door) situated at the unit inlet.

In one form, the release liner advancing member is a drive roller, where a guide plate cooperates with the drive roller. In a particular form, the guide plate comprises at least one projecting finger and the drive roller comprises a complementary groove such that the guide plate and the drive roller cooperate to inhibit wrapping of the release liner around the drive roller. An anti-backlash roller clutch has a rubber-coated non-driven nip roller with the ability to promote adjustable tension. The clutch prevents the roll from rotating backward due to the weight of the full reel of release liner that would otherwise cause the web to create slack and consequent misalignment or breakage on the driven roller. The drive mechanism may include a brake that upon engagement inhibits movement of a liner supply device (the latter of which may be in the form of a spool as discussed below) from coasting. One form of the brake is a pneumatic brake. An air bleed valve can further be included to provide a blast of low-pressure air to keep the release liner tape lower in the unit so that the serpentine loops occur in a more organized fashion, thereby reducing the risk of a double feed through the output slot. In the present context, a double feed occurs when an upstream folded-over portion of the liner gets fed through the outlet along with downstream portions of the liner. Upon dispensing of this upstream portion of the liner, a snapping motion could cause the liner to break.

The outlet, which is preferably formed in a bottom side plate of the accumulator, can be adjusted to control the tension created on the outlet of the unit. In one form, the dimensions of an orifice at the outlet can be tightened or loosened. For example, when the dimension of the outlet is tightened, the release liner pulls through the outlet with more tension. In addition, the outlet may define a tortuous path to for example promote additional resistance to release liner movement when no pulling tension is being applied. In addition, a plurality of release liner outlets may be disposed in the accumulator, thereby permitting orientation of the accumulator to coincide with that of other componentry useable in the dispensing of release liner. In a preferred embodiment, the tortuous path defines a chevron shape. The release liner staging unit may also include a controller with one or more sensors configured to detect a quantity of release liner in the accumulator. A feedback mechanism can be used to operate a motor (or related means for turning the drive roller) and the brake upon receipt of an appropriate signal from the sensor. In a more particular form, the controller is coupled to a time delay relay to promote hysteresis in the filling of the accumulator with release liner.

According to another aspect of the invention, a device is disclosed. In addition to the release liner staging unit discussed in conjunction with the previous aspect, the device includes a liner supply device and a liner affixing device configured to dispense the release liner from the release liner staging unit. As with the previous embodiment, movement of release liner may be by a motor coupled to a roller or related release liner advancing member. Optionally, the device includes an adhesive dispenser configured to place adhesive on a substrate. In another option, the liner supply device comprises a spool. The spool further comprises a plurality of retaining disks to promote substantial alignment of the release liner. In the present context, the term "substantial" and its variants are utilized to represent the inherent degree of uncertainty that may be attributed to any quantitative comparison, value, measurement, or other representation. As such, it refers to an arrangement of elements or features that, while in theory would be expected to exhibit exact correspondence or behavior, may in practice embody something slightly less than exact. The term also represents the degree by which a quantitative representation may vary from a stated reference without resulting in a change in the basic function of the subject matter at issue. These spool retaining disks can be placed at axial ends of the roll's core, thereby preventing the lateral slippage and release of the liner due to side loads, surface irregularities or skewed pulled to one side by the release liner application device. One or more spacers may be disposed between the retaining disks, thereby allowing differing widths of the release liner to be placed on the spool. Regarding the spool, it may include an air chuck to promote ease on spool loading and unloading. The air chuck allows the user to release compressed air for selective engagement of reels of release liner. Furthermore, at least two of the rollers can be placed in contact with one another to form an adjustable tensioning device. In addition, at least one of these cooperating rollers can include a knurled surface to facilitate threading of the liner. A guide plate incorporating anti-wrap fingers can be placed inside grooves in the driven roller at the unit inlet. The fingers prevent loops of release liner from winding up around the driven roller and otherwise causing the web to break. In another option, the release liner staging unit is substantially aligned with the supply of release liner along the liner's lengthwise dimension.

In yet another option, the device includes one or more sensors to monitor release liner parameters, such as movement or the presence of the liner. Such sensors can be signally coupled to a controller. In one form, the sensors can monitor for a break in the release liner; upon such sensing and subsequent signal sent the controller, the device can be shut down. A time delay relay may also be included to control the delay between the time that the sensor indicates the presence of release liner in the unit and when a feed motor supplying release liner to the unit is shut off. This delay allows the unit to be more densely filled in the accumulator, thus reducing the unit's duty cycle. A pneumatic brake can be included to stop the roll from supplying release liner to the unit, thereby avoiding "coasting" that would otherwise create slack that could break the web when the device starts feeding again. Optionally, the device may further include an air chuck that allows the user to release compressed air for engaging and disengaging the hub holding the reels of release liner.

According to another aspect of the invention, a method of affixing a release liner onto an adhesive layer is disclosed. The method includes arranging a substrate to have the adhesive layer disposed on it, selectively feeding and storing a supply of release liner to an accumulator, moving at least a portion of the release liner stored in the accumulator to a position adjacent the adhesive layer disposed on the substrate, and covering at least a portion of the adhesive layer with the release liner. The accumulator functions in a manner similar to that of the previously-described aspects.

Optionally, the selectively fed release liner includes storing it in a substantially serpentine pattern in the accumulator's storage compartment. In another option, a drive mechanism is operated to effect feeding of the release liner, where the drive mechanism includes a motor, one or more drive roller responsive to the motor such that they movably contact the release liner, and a brake cooperative with the motor. The brake and motor can work together such that when the motor is turning the drive roller, the brake is preferably disengaged, thereby not substantially inhibiting the movement of the release liner into the accumulator. Contrarily, when operation of the motor ceases, the brake engages the release liner to slow down or stop movement of the release liner into the accumulator. A controller may be coupled to the drive mechanism and the accumulator such that upon detecting an absence of release liner in the accumulator, the controller can instruct the motor to introduce additional release liner into the accumulator. The aforementioned hysteresis to produce the saturated level in the storage compartment can be achieved by having a time delay protocol built into the controller. For example, an appropriate time delay relay can be used to effect such hysteresis. In addition, a liner affixing device can be used to dispense the release liner from the accumulator. Furthermore, adhesive may be applied on a substrate such that upon a downstream passage of the adhesive by the liner affixing device, the liner covers at least a portion of the adhesive placed on the substrate.

According to still another aspect of the invention, a method of reducing inertial effect from a supply of release liner is disclosed. The method includes selectively feeding release liner to an accumulator, storing the release liner in a substantially serpentine pattern in the accumulator, measuring an amount of space in the storage compartment occupied by the release liner and operating a time delay cooperative with the measuring such that after the amount of space occupied by the stored release liner drops below a predetermined threshold, additional release liner is introduced into the accumulator to saturate a level of release liner therein. In one optional form, either a fixed-speed or a variable-speed drive mechanism (for example, a variable speed motor or related means for operating a release liner advancing member) could be incorporated to facilitate feeding release liner to the accumulator. Such a drive mechanism could be similarly used in conjunction with the devices of the previously-described aspects. Use of a variable-speed drive mechanism could promote continuous (rather than stop-start) operation, where a quiescent operating point could be established.

BRIEF DESCRIPTION OF THE SEVERAL VIEWS OF THE DRAWINGS

The following detailed description of the present invention can be best understood when read in conjunction with the following drawings, where like structure is indicated with like reference numerals and in which:

FIG. 1 is a front elevation view of a system for applying adhesive and a release liner onto a substrate according to the prior art;

FIG. 2 shows a front elevation view of a release liner application system incorporating an accumulator according to the prior art;

FIG. 3F shows a rear elevation view of the release liner staging unit of FIG. 3A;

FIG. 3G shows a side elevation view of the release liner staging unit of FIG. 3A.

DETAILED DESCRIPTION

Figure 3A:
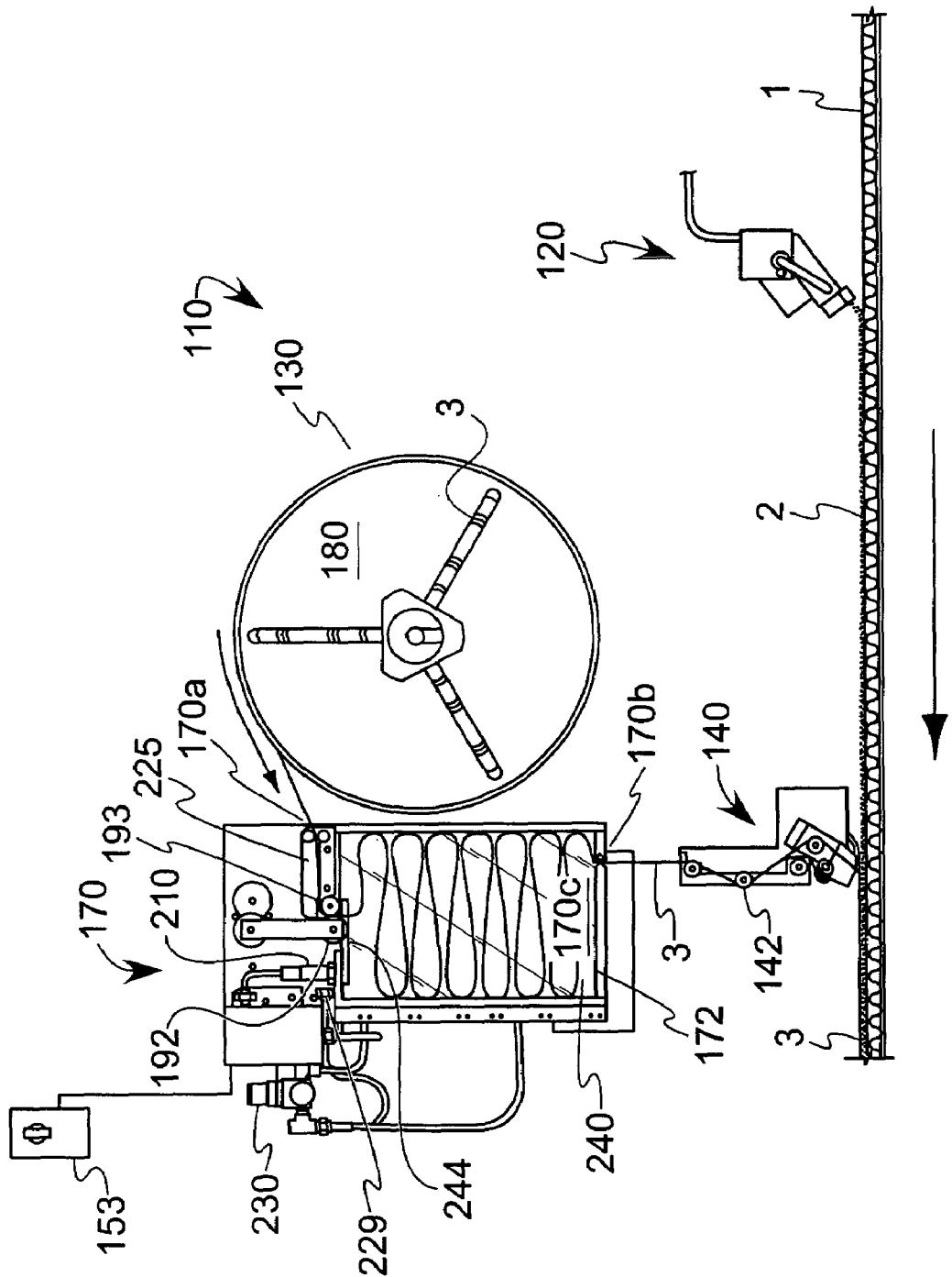
FIG. 3A shows a front elevation view of a system including an adhesive application device, release liner application device and release liner staging unit according to an aspect of the present invention.

Referring first to FIG. 1, an adhesive layer and release liner application system 10 according to the prior art is shown. The system 10 sequentially places an adhesive layer 2 and a release liner 3 onto a moving substrate 1. In one configuration, the adhesive layer 2 is a hot melt adhesive that is deposited in viscous liquid form, while the release liner 3 is a relatively thin (on the order of a few mils or less) film of silicone coated paper or similar non-adherent material. The substrate is a generally planar paper, plastic or cardboard material which, after adhesive deposition, can be folded or stacked for subsequent use. The system 10 includes an adhesive application device 20, spool 30 of release liner and a release liner application device 40 with numerous rollers 42. Adhesive application device 20 typically includes a vat to store the adhesive, as well as related heating devices and conduit to liquefy and transport the adhesive to one or more deposition nozzles.

Referring next to FIG. 2, a variation on the prior art adhesive layer and release liner application system 10 is shown, where in addition to the aforementioned spool 30 of release liner and release liner application device 40 (presently shown in more detail) with numerous rollers 42, there is an accumulator 70 used as a buffer to avoid improper feeding of release liner 3 during operational transients. The accumulator 70 is in the nature of a passive box, in that it merely acts as a temporary storage place for release liner 3; it possesses no ability to match the liner needs of release liner application device 40 to the supply needs of spool 30. Motor 50 turns a drive roller 93 to coax release liner 3 into the accumulator 70, while a pivoting dancer arm 60 can be used to match the delivery of release liner 3 to accumulator 70. Inlet 70A and outlet 70B are mounted on the side of accumulator 70 to allow horizontal ingress and egress of release liner 3. When a supply of release liner 3 is no longer required, such as through a limit reached inside the accumulator 70, a lever arm 72 moves, activating fill switch 71 and causing motor 50 to be turned off. Nevertheless, frequent cycling of the motor 50 can cause compatibility problems with the accumulator 70, especially in terms of misfeeding release liner 3 through inlet 70A and outlet 70B. An additional shortcoming of system 10 when equipped as shown is that the dancer arm 60 has different response characteristics over the course of spool 30 depletion. For example, its spring response rate may be optimized for a spool 30 that is relatively fresh, but grossly mismatched as the diameter of the spool 30 decreases. Such performance can lead to snapping movement that could cause the release liner 3 to break, as well as overfilling the accumulator 70, thus defeating the purpose of the accumulator 70. In addition, relatively heavy gauge liner must be used, as otherwise the lever arm 72 and fill switch 71 will not respond until the serpentine buildup of liner 3 in the accumulator 70 has become excessive.

Referring next to FIGS. 3A through 3G, an adhesive layer and release liner application system 110 is disclosed. The system 110 includes an adhesive application device 120, spool 130 of release liner 3, release liner application device 140 and release liner staging unit 170 with inlet 170A, outlet 170B and accumulator (also referred to as an accumulation chamber, chamber or a release liner storage compartment) 170C (which defines the interior, liner-storing portion of the housing that makes up release liner staging unit 170) between the inlet and outlet. Substrate 1 is moved, such as by conveyor (not shown), sequentially underneath adhesive application device 120 and release liner application device 140, picking up adhesive 2 and release liner 3, respectively. Release liner 3 is supplied to release liner application device 140 from spool 130 through inlet 170A, where it passes between drive roller 193 and an adjacent idler roller 192 to be stored in accumulation chamber 170C until needed by release liner application device 140, at which time it is pulled through outlet 170B in bottom side plate 172 of the housing. The configuration of the release liner in storage compartment 170C is such that it assumes a substantially serpentine pattern as shown in the figure. Spool retaining disks 180 over spool 130 and a door panel 240 used to cover accumulation chamber 170C serve to keep release liner 3 from becoming axially misaligned. In one embodiment, the door panel 240 may be made from a transparent material (such as Lexan® or acrylic) so that an individual monitoring the operation of the release liner application system 110 can visually verify that the storage of release liner 3 in accumulation chamber 170C is being done properly. In addition, spacers (not shown) can be added such that door panel 240 can be mounted to accumulation chamber 170C in differing widths, thereby accommodating release liner 3 of differing widths.

Main power box 153 includes a switch to turn the release liner staging unit 170 on and off, while sensor 210 is placed in accumulation chamber 170C to detect when the chamber reaches a predetermined fill level. A controller (which may, for example, be microprocessor-based, and made up of numerous components) may be used to establish a circuit used to coordinate operation of the motor 150 and pneumatic brake 160 in response to detected signals from sensor 210 or other related detector. In one configuration, the controller may include a power source (such as main power box 153), sensor 210, associated circuitry, and related components, such as the time delay relay 155 (discussed below). The controller acts through a feedback mechanism to automatically stop and start the motor 150 and brake 160 as needed. For example, if the accumulator 170C is filling up with release liner 3, and upon receipt of an appropriate (either manual or detected) signal, the controller instructs motor 150 (discussed below) to stop and causes a pneumatic brake 160 (also discussed below) to engage. An anti-static tinsel device 225 can be placed just upstream of drive roller 193.

Figure 3E:
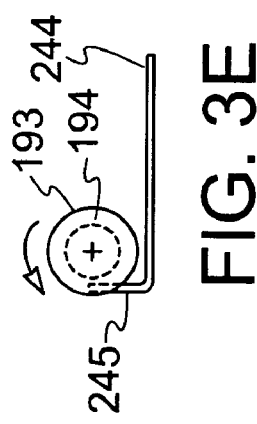
FIG. 3E shows an elevation view of the engagement of the drive roller and corresponding guide plate of FIG. 3D.
Figure 3B:
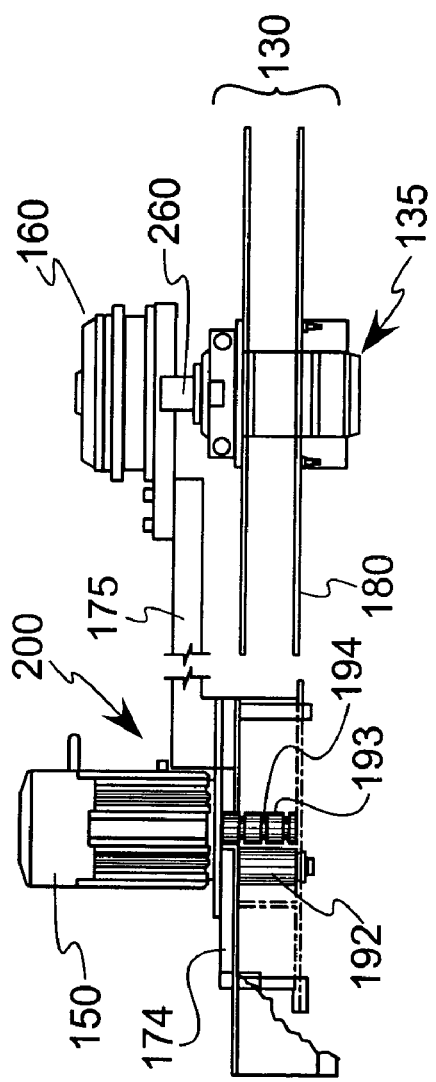
FIG. 3B shows a top view of a portion of the system of FIG. 3A.

Referring with particularity to the top view of FIG. 3B, the connection of the motor 150 to drive roller 193 through rear wall 174, as well as the connection of pneumatic brake 160 to spool 130, is shown. Together, motor 150 and rollers 192, 193 make up a release liner drive unit 200 to ensure that, upon an appropriate signal, more release liner 3 is either fed into or prevented from entering into the accumulation chamber 170C. The aforementioned controller and sensor 210 may also form part of the drive unit 200, or may be separate components configured to cooperate with the drive unit 200. Similarly, motor 150 may form either an integral component of drive unit 200, or may be a separate component that that can be made to turn drive roller 193 on an as-needed basis. Pneumatic brake 160 can be made to cooperate with the drive unit 200 to ensure smooth, coordinated operation, thereby avoiding excessive release liner 3 buildup in accumulator 170C and snapping of the release liner 3 upon startup of motor 150. Brake mounting extension arm 175 rigidly couples the pneumatic brake 160 and spool 130 to rear wall 174 of release liner staging unit 170. Drive roller 193 includes grooves 194 the use of which will be discussed in more detail below. Pneumatic brake 160 is coupled to spool 130 through idler shaft 260, while spool 130 is mounted to a pneumatic chuck 135, which includes an inflatable core to allow quick mounting and dismounting of spool 130. A pair of spool retaining disks 180 as previously discussed are spaced along pneumatic chuck 135 to provide lateral support to release liner (not presently shown).

Motor 150 and pneumatic brake 160 are responsive to sensor (for example, a light sensor) 210 shown in FIG. 3A such that upon the level of release liner 3 stored in accumulator 170C falling below a threshold determined by sensor 210, the controller instructs motor 150 to commence, thereby turning drive roller 193 (which may include a relatively high friction surface to better engage the release liner 3) to pull release liner 3 from spool 130 until enough release liner 3 is replenished in chamber 170C, at which time motor 150 is stopped, and pneumatic brake 160 can be activated. By the coordinated operation of the motor 150 and pneumatic brake 160 to ensure a smooth flow of release liner 3, dancer arms (such as those discussed in conjunction with the prior art) can be removed or their operation simplified.

Referring with particularity to FIGS. 3F and 3G, a time delay relay 155 is coupled to pneumatic brake 160 and motor 150 through a series of tubing 228, valves 229 and regulator 230 to effect a hysteresis-like response in filling chamber 170C with release liner 3. The presence of an air cushion that is made possible by the relatively close fit between the release liner 3 and its lateral support in the release liner staging unit 170, coupled with the relatively compliant nature of the serpentine storage profile (as shown in FIG. 3A) assumed by release liner 3 when disposed in chamber 170C, is such that after a period of time, the release liner 3 settles (such as due to the weight of later-added liner onto the earlier-added liner within the chamber 170C, as well as the gradual escaping of air between the serpentine layers), thereby increasing the amount of available space in the chamber 170C available for storing release liner 3. By using time delay relay 155 and the ancillary equipment discussed above, this hysteresis can be exploited to delay the onset of motor 150 stoppage and pneumatic brake 160 deployment to allow the chamber 170C to slightly saturate, thereby reducing the duty cycle (including concomitant heat buildup) of the motor 150 and pneumatic brake 160 and extending the life of these components. In a slightly saturated configuration, the release liner storage compartment 170C of the accumulator is overfilled enough to slightly compress the relatively compliant stack of release liner 3, but not so great as to cause the release liner 3 to crimp, crease, twist or otherwise lose its ability to maintain a discontinuity-free profile. In addition, a backlash roller clutch (using, for example, needle bearings (not shown) inside idler roller 192) may be included to cooperate with idler roller 192. The operation of pneumatic brake 160 is such that it prevents the spool 130 from coasting, which would otherwise lead to slack developing in the release liner 3 during periods of system 110 inactivity, slack that upon reactivation of the system 110 could produce a snapping effect in and possible damage to the liner.

Figure 3D:
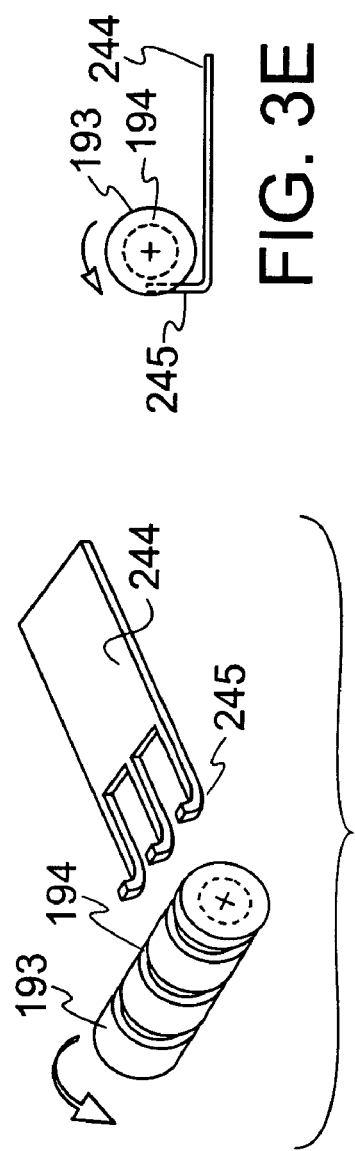
FIG. 3D shows a perspective view of a drive roller and corresponding guide plate according to an aspect of the present invention.
Figure 3C:
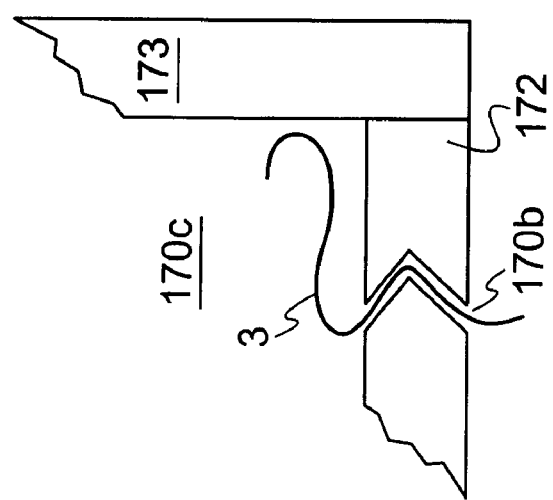
FIG. 3C shows a detail view of an outlet of the release liner staging unit of FIG. 3A.

Referring next to FIG. 3C, a detail view of outlet 170B of release liner staging unit 170 is shown. The lowermost portion of chamber 170C is defined by bottom side plate 172. Rather than having a straight-through passage of bottom side plate 172, a tortuous path is formed, thereby inhibiting the tendency of the release liner 3 from being forced through outlet 170B during periods of system inactivity. In the present context, a tortuous path includes any such path that involves at least one significant change in direction (for example, an angle change of between ninety and two hundred and seventy degrees) or multiple changes of direction the cumulative effect of which is to significantly hamper the ability of a release liner 3 not under an external pulling force (i.e., a pulling force other than that associated with the gravity of the portion of the release liner already below the bottom outlet 170B) to continue passing through bottom outlet 170B. In the version shown, the tortuous path defines a sideways chevron shape. It will be appreciated by those skilled in the art that the bottom outlet 170B could also involve a serpentine shape. The bottom outlet 170B is more conducive to smooth delivery of release liner 3 to the application device 140 than the side-mounted exit of the prior art, while the tortuous path of bottom side plate 172 reduces the likelihood of inadvertent release of the liner during periods where there is no demand from the substrate 1. The accumulator 170C needs to be reversible, depending on the feed direction of the release liner 3. Thus, although not presently shown, it will be appreciated by those skilled in the art that the accumulator 170C can have an outlet 170B at each side of bottom side plate 172. This would allow one accumulator 170C to be used on either side of a release liner application system. In certain instances, it may be necessary to pass spliced release liner. Bottom outlet 170B could be made larger to accommodate the increased thickness of such a splice, although not so large as to promote the free-flow gravity feed of release liner. In an alternative approach, bottom outlet 170B can be made adjustable via spring-loaded or other self-adjusting features. In this way, bottom outlet 170B could be both compatible with splices as well as avoid the inadvertent release of liner during periods where there is no demand.

Referring with particularity to FIGS. 3D and 3E, the relationship between drive roller 193 and guide plate 244 is shown. Drive roller 193 may include a series of grooves 194 that allow complementary-shaped anti-wrap fingers 245 that are cantilevered from guide plate 244 to cooperate with one another. The fingers 245 are biased to keep contact between them and the grooves 194 of drive roller 193, thereby deterring the release liner 3 from getting caught up and winding around drive roller 193. Guide plate 244 can be mounted to appropriate structure within chamber 170C.

Figure 4:
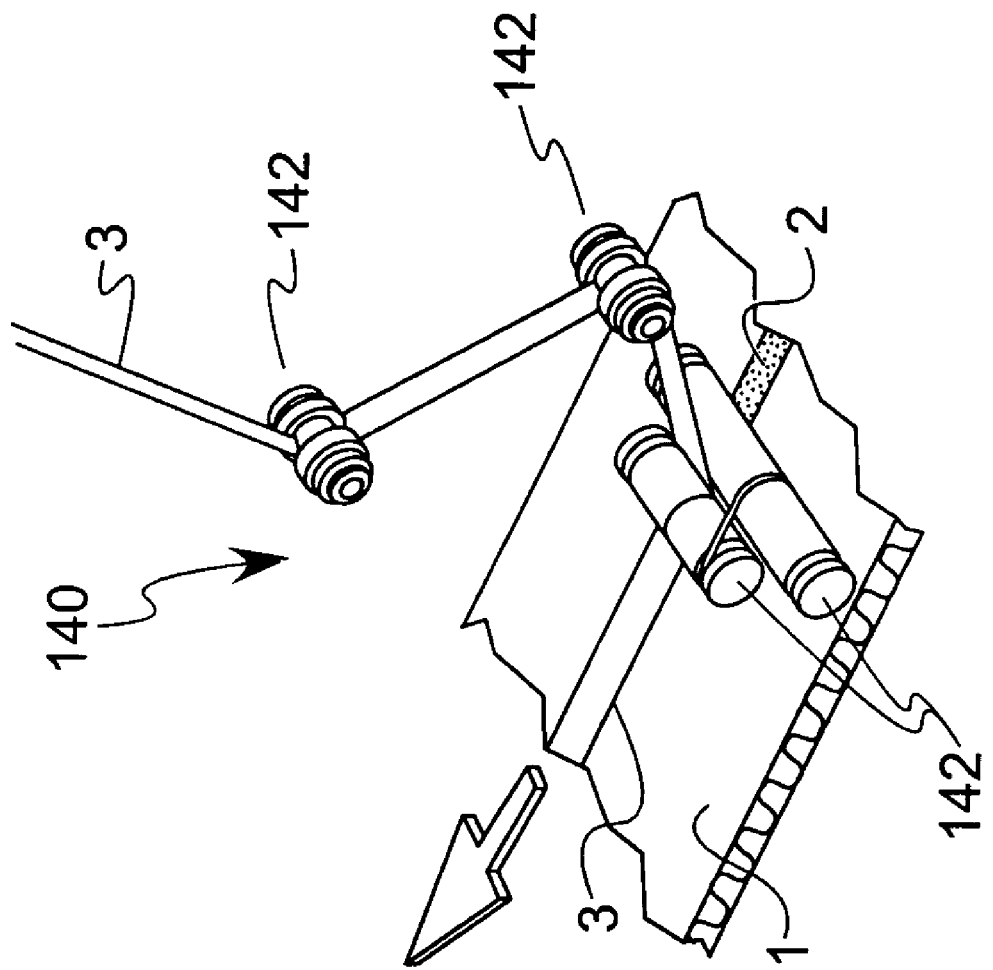
FIG. 4 shows a perspective view of a simplified release liner application device.

Referring next to FIG. 4, a perspective view showing the application of release liner 3 to an adhesive layer that has been placed on top of substrate 1 includes a simplified representation of release liner application device 140 with rollers 142. As previously indicated, the release liner is made from a relatively non-stick material (such as silicone-coated paper) that allows ease of removal during a deferred-use application. By avoiding over-tensioning and related deformation of the release liner 3 through the use of saturating the accumulator of the of release liner staging unit 170, the release liner will not pull away from or slide off the applied adhesive.

While certain representative embodiments and details have been shown for purposes of illustrating the invention, it will be apparent to those skilled in the art that various changes may be made without departing from the scope of the invention, which is defined in the appended claims.

What is claimed is:

1. A release liner staging unit comprising:
    an accumulator configured to store a quantity of release liner while said release liner is waiting to be dispensed, said accumulator defining therein a release liner inlet, a release liner storage compartment and a release liner outlet, said outlet disposed vertically below said inlet to facilitate the movement of release liner therebetween;
    a drive mechanism configured such that after attainment of a predetermined level of said release liner in said storage compartment, said drive mechanism continues to introduce release liner until a saturated level of release liner is formed in said storage compartment, said drive mechanism comprising:
        at least one release liner advancing member responsive to a motor and configured to contact said release liner; and
        a brake cooperative with said release liner advancing member such that upon operation of said release liner advancing member, said brake does not substantially inhibit the movement of said release liner into said accumulator, and upon cessation of operation of said release liner advancing member, said brake engages said release liner to substantially inhibit the movement of said release liner into said accumulator; and
    a controller cooperative with said drive mechanism, said controller comprising:
        a sensor configured to detect a fill level of said release liner in said accumulator; and
        a feedback mechanism configured to operate said release liner advancing member and said brake upon receipt of an appropriate fill level signal from said sensor.

2. The release liner staging unit of claim 1, wherein said brake comprises a pneumatic brake.

3. The release liner staging unit of claim 2, wherein said release liner advancing member comprises a drive roller.

4. The release liner staging unit of claim 3, further comprising a guide plate cooperative with said drive roller.

5. The release liner staging unit of claim 4, wherein said guide plate comprises at least one projecting finger and said drive roller comprises a complementary groove such that said guide plate and said drive roller cooperate to inhibit wrapping of said release liner around said drive roller.

6. The release liner staging unit of claim 1, wherein said outlet defines a tortuous path therein.

7. The release liner staging unit of claim 6, wherein said tortuous path defines a chevron shape.

8. The release liner staging unit of claim 1, further comprising a time delay relay cooperative with said controller to effect said attainment of said saturated level of release liner.

9. The release liner staging unit of claim 1, further comprising a plurality of release liner outlets disposed in said accumulator.

10. A device comprising:
    a liner supply device configured to hold a quantity of release liner therein;
    a release liner staging unit configured to receive a liner from said liner supply device, said release liner staging unit comprising:
        an accumulator configured to store a quantity of release liner while said release liner is waiting to be dispensed, said accumulator defining therein a release liner inlet and a release liner outlet, said outlet disposed vertically below said inlet to facilitate the movement of release liner therebetween; and
        a drive mechanism configured such that after attainment of a predetermined level of said release liner in said accumulator, said drive mechanism continues to introduce release liner until a saturated level of release liner is formed in said accumulator, said drive mechanism comprising:
            at least one release liner advancing member responsive to a motor and configured to contact said release liner; and
            a brake cooperative with said release liner advancing member such that upon operation of said release liner advancing member, said brake does not substantially inhibit the movement of said release liner into said accumulator, and upon cessation of operation of said release liner advancing member, said brake engages said release liner to substantially inhibit the movement of said release liner into said accumulator;
        a controller cooperative with said drive mechanism, said controller comprising:
            a sensor configured to detect a fill level of said release liner in said accumulator; and
            a feedback mechanism configured to operate said release liner advancing member and said brake upon receipt of an appropriate fill level signal from said sensor; and
    a liner affixing device configured to dispense said release liner from said release liner staging unit.

11. The device of claim 10, wherein said liner supply device comprises a spool.

12. The device of claim 11, wherein said spool further comprises a plurality of retaining disks configured to keep release liner disposed therebetween substantially aligned.

13. The device of claim 12, further comprising at least one spacer disposed between said retaining disks, said at least one spacer configured to allow differing widths of said release liner to be placed on said spool.

14. The device of claim 12, wherein said spool further comprises an air chuck.

15. The device of claim 10, further comprising an adhesive dispenser configured to place adhesive on a substrate such that upon subsequent passage of said adhesive and said substrate adjacent said liner affixing device, said liner covers at least a portion of said adhesive.

* * * * *